May 23, 1972     P. W. SHAHANI     3,664,539
TARPAULIN TIE DOWN ASSEMBLY FOR OPEN TOP CONTAINERS
Filed Jan. 7, 1970
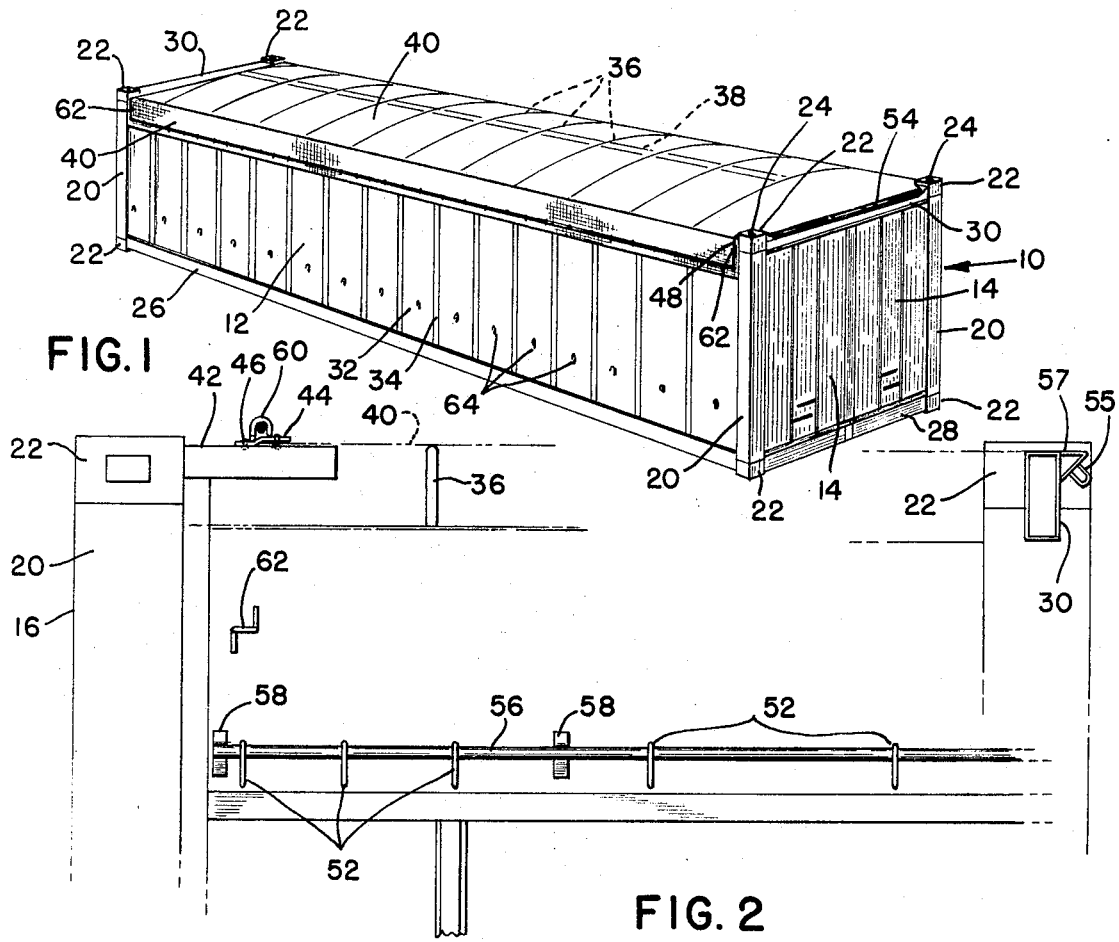
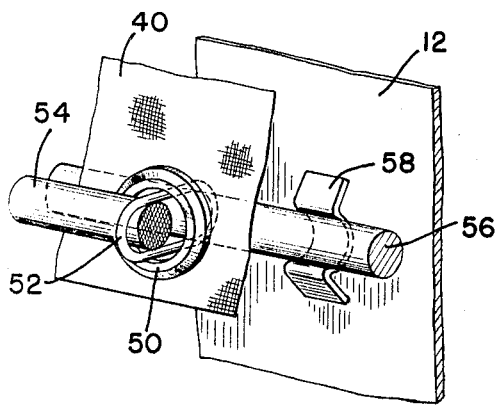
INVENTOR.
PRAKASH W. SHAHANI United States Patent Office 3,664,539
Patented May 23, 1972

3,664,539
TARPAULIN TIE DOWN ASSEMBLY FOR OPEN TOP CONTAINERS
Prakash W. Shahani, Edison, N.J., assignor to Sea-Land Service, Inc., Elizabeth, N.J.
Filed Jan. 7, 1970, Ser. No. 1,083
Int. Cl. B60p 7/04
U.S. Cl. 220—24      4 Claims

ABSTRACT OF THE DISCLOSURE

A tie-down assembly for securing a tarpaulin to an open top freight container in a weathertight, tamperproof manner including a plurality of displaceable ring members secured to a tarpaulin by a rope extending around the container. The rings, spaced from the container side walls by brackets, are aligned with eyelets extending around the marginal edges of the tarpaulin. The rope, laced through the ring members exteriorly of the tarpaulin, is provided with means for securing the ends together for receiving a seal.

BACKGROUND, BRIEF SUMMARY AND OBJECTS OF THE INVENTION

Generally, this invention relates to an open top freight container and tarpaulin cover therefor, and more particularly to apparatus for securing a tarpaulin in position on a container. Open top freight containers adapted to be transferred between marine vessels and land vehicles for successive movement by water and land are disclosed, for example, in U.S. Pat. No. 3,044,653. Containers of this general type are provided to accommodate large, bulky cargo which for various reasons cannot be loaded within conventional closed containers through the rear doors. Such open top containers are provided with a removable tarpaulin cover to facilitate positioning of large, bulky cargo therein, and which can be replaced to cover the open top of the container in a weathertight manner.

Generally, the tarpaulin cover is a single sheet of fabric or other suitable material having the margins lined with a series of grommets or eyelets. A series of tie ropes extend between the grommets, and hooks horizontally spaced along the container secure the tarpaulin in position on the container. Tarpaulin tie-down assemblies of this type are sufficient to transport cargo within the United States and between the United States and Puerto Rico.

However, in shipping cargo across the boundaries of certain foreign countries, the tarpaulin must be secured to the container body in a tamperproof manner. A Customs Convention exists among a number of countries permitting vehicles or containers to be sealed under Customs direction in one country and then to cross the borders of other member countries without reinspection until arrival at the final destination. The Customs Convention, known as the TIR agreement, requires that the tarpaulin overlap each side of the container a minimum of twelve inches, and that the distance between any two consecutive eyelets or grommets in the tarpaulin be spaced a maximum distance of nine inches from each other. Furthermore, the continuous rope or cable, which is sealed at the ends, must extend around the container to secure the tarpaulin to the container in a tamperproof manner. TIR regulations require that the tarpaulin be secured to the container such that no cargo can be removed from or introduced into the container without obvious evidence of damage or without breaking of the Customs seals.

In order to comply with the TIR regulations, the conventional approach has been to provide a horizontal series of fixed rings or loop members along the container side walls spaced below the top rail of the container. The tarpaulin, which must be of non-stretchable, one-piece construction, is provided with grommets or eyelets spaced to coincide with the rings or loops secured in fixed relation to the container side walls. A wire rope, which may be nylon coated, is threaded through each fixed ring exteriorly of the grommets to secure the tarpaulin. A hollow rivet or other suitable means is secured to each end of the wire rope for receiving a Customs seal.

Cargo container tie down assemblies having the fixed rings and wire ropes are objectionable for transport of cargo within the U.S. due to the time and expense required in aligning a substantial number of tarpaulin grommets with the fixed rings or loops, and threading of the rope through each fixed ring.

The present invention is directed to a tarpaulin tie down assembly comprising a series of rings slidable on rods extending along the container side walls. The rods are spaced from the container side walls by a series of brackets or spacers secured to the rod and to the container walls. The brackets are spaced, each from the other, a distance corresponding to the particular number of slidable rings to be located therebetween such that the maximum distance between properly positioned rings will not exceed nine inches when inserted within the tarpaulin grommets. Standard tarpaulin latching hooks also are provided in the container side walls below the slidable rings in the fixed rods for receiving tie ropes or rubber strings to secure the tarpaulin in a conventional manner.

With this arrangement, the container can be utilized for shipping cargo within the United States by attaching tie ropes or rubber strings, having hooks or other fasteners on the ends thereof, to the tarpaulin grommets or rings and to the lashing hooks. Alternatively, the tarpaulin grommets can be aligned with the slidable rings and secured thereto by threading a wire rope through the rings, under the direction of Customs in one member country of the TIR Convention and then transported across the borders of member countries without reinspection until arrival of the cargo at its destination.

One of the primary objects of the invention is a tie down assembly for securing a tarpaulin to an open top container in a tamperproof and weathertight manner.

Another object of the invention is the provision of a tie down assembly facilitating alignment of tarpaulin grommets with securing rings and facilitating threading of a wire rope through the rings.

A further object of the invention is a tarpaulin tie down assembly for reducing the time and expense required to secure tarpaulin in position.

Other objects and advantages will be readily apparent to those skilled in the art during the course of the following description of one embodiment of the present invention taken in conjunction with the accompanying drawings.

BRIEF DESCRIPTION OF THE FIGURES

FIG. 1 is an isometric view of an open top container having a tarpaulin secured thereon by a series of slidable rings and the wire rope;

FIG. 2 is a fragmentary side elevational view of the container illustrating the fixed loops and rings slidable along the rods spaced from the container side wall for securing the tarpaulin in position; and FIG. 3 is an isometric detail view, with portions broken away, illustrating the manner by which the rings, tarpaulin and rope are secured together.

DETAILED DESCRIPTION OF THE INVENTION

Reference numeral 10 refers to an open top container body basically comprising side walls 12, a pair of hinged doors 14, a front wall 16, and a floor, not shown. The container body 10 is adapted to be detachably mounted on a truck-trailer chassis or railway flat car for land transportation, and stacked in a superposed column of containers within the hold or on the deck of a ship for marine transportation. Corner posts 20 and corner castings 22, provided at the front and rear of the container body 10, support the container in stacked relationship. The corner castings 22 are secured to each of the corner posts 20 and extend to horizontal planes higher and lower than any other part of the container body so that only the castings will make contact with other containers positioned above or below the container body 10. Sockets 24 are provided in the top and bottom castings to facilitate securing together containers in stacked relation and to receive means for lifting and transferring the container body 10 between marine vessels and land vehicles. The posts 20 are connected by side sills 26, end sills 28 and top rails 30. The front and side walls 12, 16 are constructed of metal panels 32 stiffened by reinforcing ribs 34.

The container body 10 is provided with a number of roof bow elements 36 equally spaced along the length of the body, and releasably secured at the ends thereof to top rails, not shown, extending between posts 20 above the side walls 12. A ridge strap 38, extends longitudinally of the container intermediate the side walls 12 for cooperating with the roof bows to form a foundation for a removable tarpaulin 40.

A roof cap 42 extends reawardly from the top rail 30 located above the front wall of the container for supporting the forward edge portions of the tarpaulin 40. A retaining plate 44 is positioned on the roof cap and stretches substantially the width of the container body 10 to clamp the forward edge of the tarpaulin against the roof cap 42. The retaining plate 44 is secured to the roof cap 42 by a series of fasteners 46.

The tarpaulin 40 which covers the entire top opening of the container body 10 preferably is of one-piece construction having the rear corners cut out, as shown at 48, to fit around the rear corner post 20. The width of the tarpaulin 40 is substantially greater than the width of the container body 10 to overlap the side walls 12, as shown by FIG. 1. The sides of the tarpaulin 40 are equipped with equally spaced metal rimmed eyelets or grommets 50 for cooperating with fastening means for securing the tarpaulin 40 to the container side walls 12.

The tarpaulin 40 is attached to the container side walls by ring members 52 which are inserted into the eyelets 50 and by a wire rope 54 which is threaded through the ring members 52 and extends completely around the container body. The ring members 52 are slidably mounted on rods 56, positioned approximately twelve inches below the top of the container body, which extends substantially the length of the container. The rods 56 are spaced from the side walls 12 by a series of brackets 58 for permitting free sliding movement of the rings 52, within limits, longitudinally of the rods 56. The brackets 58 are horizontally spaced an equal distance from each other with a predetermined number of rings provided between adjacent brackets such that the rings are substantially equally spaced, the maximum distance between adjacent rings will not exceed nine inches.

The forward edge of the tarpaulin is secured between the roof cap 42 and the retaining plate 44, while eyelets 50 spaced along the rearward edge of the tarpaulin extend over a series of steel rod loops 55 secured to an angle plate 57. A plurality of loops 60 and 62, similar to the loops 55, are fixed to the retaining plate 44, and the side walls 12, respectively, for receiving the wire rope 54.

Thus it can be seen that the forward and rearward edges of the tarpaulin 40 can be attached to the container body by the retaining plate 44 and the rod loops 55. The sides of the tarpaulin are secured to the side walls of the container by aligning the slidable rings 52 with the eyelets 50 and inserting the rings therethrough. A wire rope then is threaded through the rings 52 and loops 55, 60 and 62. The single piece of wire rope 54 is provided with metal ends, not shown, adapted to be clamped together in a suitable manner for receiving a Customs seal such that no cargo can be removed or introduced into the container without visible traces of damage to the seal.

Open top containers carrying cargo within the United States and between the United States and Puerto Rico normally utilize tie ropes or rubber strings for securing a tarpaulin to the container side walls since the strings are more than adequate to hold the tarpaulin in position and also since the rubber strings are much faster to install than the wire rope which must be threaded through each ring in the container side walls. Therefore, horizontally spaced hooks 64 are provided on the lower zone of the container side walls for receiving an intermediate portion of the rubber string which secure the tarpaulin in position on the container. The ends of the rubber strings or ropes may be provided with hooks which are inserted into the slidable rings 52 passing through eyelets 50, or the hooks may be attached directly to the eyelets 50 for securing the tarpaulin in position.

Therefore, in shipping cargo between the United States and member countries of the TIR Customs Convention, substantial savings in time and labor can be achieved by utilizing both the slidable rings and rope, and the rubber strings and hooks for securing a tarpaulin to the container body. For example, a container loaded with cargo in the United States for shipment to one or more TIR member countries initially has the tarpaulin secured to the container by the rubber strings or tie ropes looped around the hooks fixed to the lower zone of the container side walls since this installation is faster and less expensive than threading the wire rope through the slidable rings. Upon arrival at the port of a member country, the rubber strings or tie ropes are removed and a wire rope is provided and threaded through the slidable rings passing through the tarpaulin eyelets. A Customs seal is then applied to the wire rope. The container then can be transported across the borders of member countries without reinspection until arrival at its destination where the seal is removed under Customs' supervision. When the container, loaded with other cargo, arrives back at a port for shipment to the United States, the wire rope is removed, the seal broken by Customs, and conventional rubber strings or tie ropes are installed just prior to loading the container on a ship.

What is claimed is:

1. A tie down assembly for securing a tarpaulin, having a series of spaced openings therein, in a weathertight and tamperproof manner to an open-topped freight container having end and side walls comprising: support means secured to at least one of the container walls, said support means including an elongated bar, a plurality of displaceable link members freely slidable on said bar means within prescribed limits, each of said link members forming a loop for insertion through the openings formed within the tarpaulin, and an elongated flexible member threaded through the loops of said link members outside of said tarpaulin for interlocking the link members with the tarpaulin.

2. A tie down assembly as defined in claim 1, said support means further including means for spacing said bar means from the container walls.

3. A tie down assembly as defined in claim 2, wherein said spacer means limit the movement of said displaceable members on said bar means.

4. A tie down assembly as defined in claim 2, said spacer means comprising a plurality of brackets spaced along at least one container wall, and wherein a predetermined number of said link members are slidably positioned on said bar means intermediate adjacent ones of said brackets.

References Cited

UNITED STATES PATENTS

| | | | |
|---|---|---|---|
| 3,494,658 | 2/1970 | Maes, Jr. | 296—100 |
| 2,974,999 | 3/1961 | Stuart | 296—100 |
| 3,521,689 | 7/1970 | Woods, Jr. | 150—7 |
| 2,443,478 | 6/1948 | Reid | 296—100 |
| 3,052,498 | 9/1962 | Lessing et al. | 296—100 |
| 1,454,220 | 5/1923 | Hall | 9—1 |
| 558,401 | 4/1896 | Lobee | 9—1 |

FOREIGN PATENTS

| | | | |
|---|---|---|---|
| 68,897 | 2/1930 | Sweden | 9—1 |

JOSEPH R. LECLAIR, Primary Examiner

S. MARCUS, Assistant Examiner

U.S. Cl. X.R.

150—52 R; 220—15; 248—361; 296—100